US006049791A

United States Patent [19]

Lerner

[11] Patent Number: 6,049,791

[45] Date of Patent: Apr. 11, 2000

[54] UTILITY METER AND DISPLAY SYSTEM

[76] Inventor: Sam Lerner, 575 Kent Ave. #3, Brooklyn, N.Y. 11211

[21] Appl. No.: 08/783,352

[22] Filed: Jan. 16, 1997

[51] Int. Cl.[7] .......... G06F 17/60

[52] U.S. Cl. .......... 705/412; 324/115; 324/142; 340/870.02; 702/61; 702/62

[58] Field of Search .......... 324/115, 140 R, 324/142; 340/870.02; 702/61, 62; 705/400, 412

[56] References Cited

U.S. PATENT DOCUMENTS

| | | | |
|---|---|---|---|
| D. 357,426 | 4/1995 | Ison | D10/99 |
| 4,393,455 | 7/1983 | Douglas et al. | 235/432 |
| 4,449,187 | 5/1984 | Scott | 705/412 |
| 4,471,442 | 9/1984 | Douglas et al. | 705/416 |
| 4,803,632 | 2/1989 | Frew et al. | 705/412 |
| 5,153,837 | 10/1992 | Shaffer et al. | 705/412 |
| 5,214,587 | 5/1993 | Green | 702/60 |
| 5,287,287 | 2/1994 | Chamberlain et al. | 702/60 |
| 5,808,558 | 9/1998 | Meek et al. | 340/870.01 |
| 5,870,140 | 2/1999 | Gillberry | 348/160 |
| 5,897,607 | 4/1999 | Jenny et al. | 702/62 |
| 5,930,773 | 7/1999 | Crooks et al. | 705/30 |

*Primary Examiner*—Edward R. Cosimano

[57] ABSTRACT

A new Utility Meter and Display System for reading and displaying utility usage information within a building structure. The inventive device includes an encasement, a microprocessor within the encasement, a display, a keypad, and a printer within the encasement for printing selected information for the user. The microprocessor is electronically connected to a water meter, an electric meter, a gas meter and a telephone for reading the usage of the various utilities. The printer is electronically connected to the microprocessor for printing out selected screens on the display. The inventive device preferably includes a modem within for receiving billing information from the utility companies for determining the current rates.

1 Claim, 4 Drawing Sheets

UTILITY METER AND DISPLAY SYSTEM

BACKGROUND OF THE INVENTION

1. Field of the Invention

The present invention relates to Utility Measuring Devices and more particularly pertains to a new Utility Meter and Display System for reading and displaying utility usage information within a building structure.

2. Description of the Prior Art

The use of Utility Measuring Devices is known in the prior art. More specifically, Utility Measuring Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Utility Measuring Devices include U.S. Pat. No. 5,214,587; U.S. Pat. No. 4,803,632; U.S. Design Pat. No. 357,426; U.S. Pat. No. 5,287,287; U.S. Pat. No. 5,153,837 and U.S. Pat. No. 4,449,187.

While these devices fulfill their respective, particular objectives and requirements, the aforementioned patents do not disclose a new Utility Meter and Display System. The inventive device includes an encasement, a microprocessor within the encasement, a display, a keypad, and a printer within the encasement for printing selected information for the user.

In these respects, the Utility Meter and Display System according to the present invention substantially departs from the conventional concepts and designs of the prior art, and in so doing provides an apparatus primarily developed for the purpose of for reading and displaying utility usage information within a building structure.

SUMMARY OF THE INVENTION

In view of the foregoing disadvantages inherent in the known types of Utility Measuring Devices now present in the prior art, the present invention provides a new Utility Meter and Display System construction wherein the same can be utilized for reading and displaying utility usage information within a building structure.

The general purpose of the present invention, which will be described subsequently in greater detail, is to provide a new Utility Meter and Display System apparatus and method which has many of the advantages of the Utility Measuring Devices mentioned heretofore and many novel features that result in a new Utility Meter and Display System which is not anticipated, rendered obvious, suggested, or even implied by any of the prior art Utility Measuring Devices, either alone or in any combination thereof.

To attain this, the present invention generally comprises an encasement, a microprocessor within the encasement, a display, a keypad, and a printer within the encasement for printing selected information for the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Utility Meter and Display System apparatus and method which has many of the advantages of the Utility Measuring Devices mentioned heretofore and many novel features that result in a new Utility Meter and Display System which is not anticipated, rendered obvious, suggested, or even implied by any of the prior art Utility Measuring Devices, either alone or in any combination thereof.

It is another object of the present invention to provide a new Utility Meter and Display System which may be easily and efficiently manufactured and marketed.

It is a further object of the present invention to provide a new Utility Meter and Display System which is of a durable and reliable construction.

An even further object of the present invention is to provide a new Utility Meter and Display System which is susceptible of a low cost of manufacture with regard to both materials and labor, and which accordingly is then susceptible of low prices of sale to the consuming public, thereby making such Utility Meter and Display System economically available to the buying public.

Still yet another object of the present invention is to provide a new Utility Meter and Display System which provides in the apparatuses and methods of the prior art some of the advantages thereof, while simultaneously overcoming some of the disadvantages normally associated therewith.

Still another object of the present invention is to provide a new Utility Meter and Display System for reading and displaying utility usage information within a building structure.

Yet another object of the present invention is to provide a new Utility Meter and Display System which includes an encasement, a microprocessor within the encasement, a display, a keypad, and a printer within the encasement for printing selected information for the user.

Still yet another object of the present invention is to provide a new Utility Meter and Display System that prevents accidental over-billing by a utility company.

Even still another object of the present invention is to provide a new Utility Meter and Display System that provides a display and a printout of the current or yearly consumption by the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
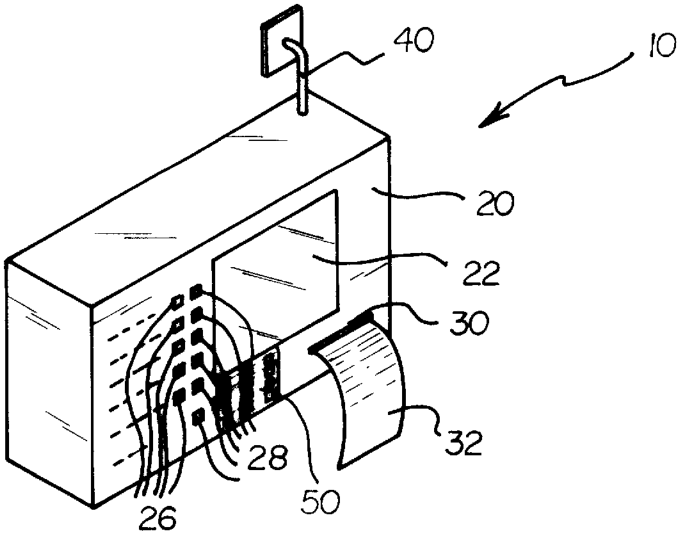
FIG. 1 is an upper perspective view of a new Utility Meter and Display System according to the present invention.

With reference now to the drawings, and in particular to FIGS. 1 through 6 thereof, a new Utility Meter and Display System embodying the principles and concepts of the present invention and generally designated by the reference numeral 10 will be described.

More specifically, it will be noted that the Utility Meter and Display System 10 comprises an encasement 20 having an interior, an unnumbered microprocessor, a display 22, a keypad 50, and a printer 30. The encasement 20 is preferably constructed for mounting to an interior wall of a building structure.

Figure 2:
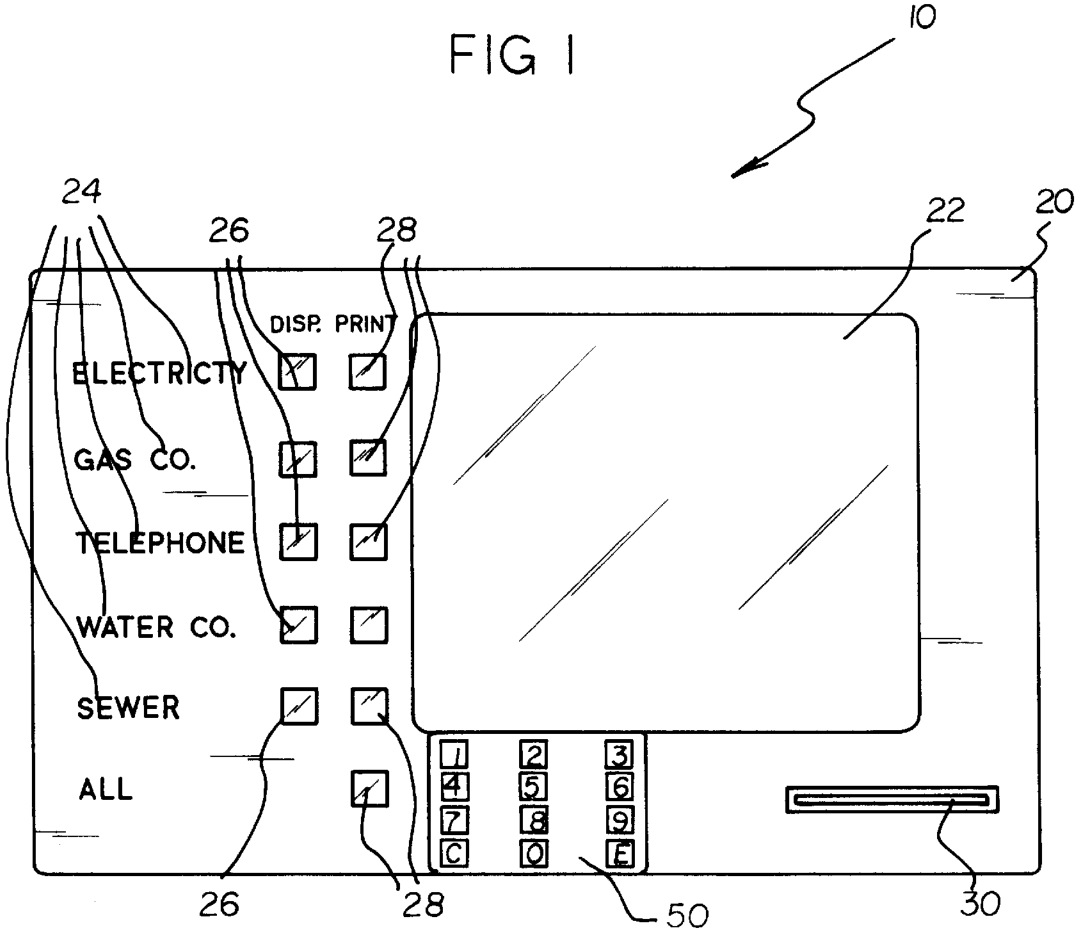
FIG. 2 is a front view of the present invention.
Figure 3:
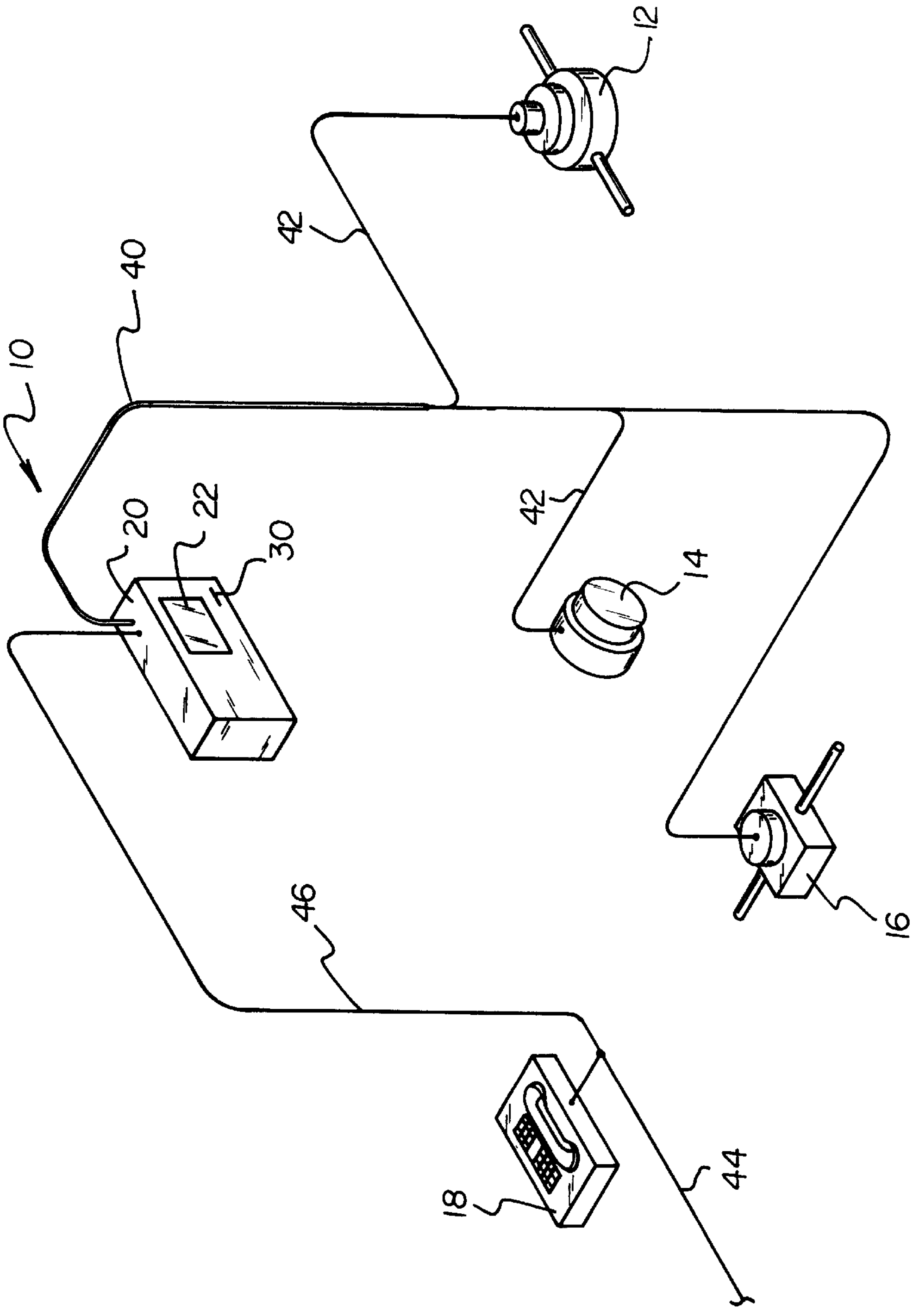
FIG. 3 is an upper perspective view of the present invention electrically connected to various utilities.
Figure 4:
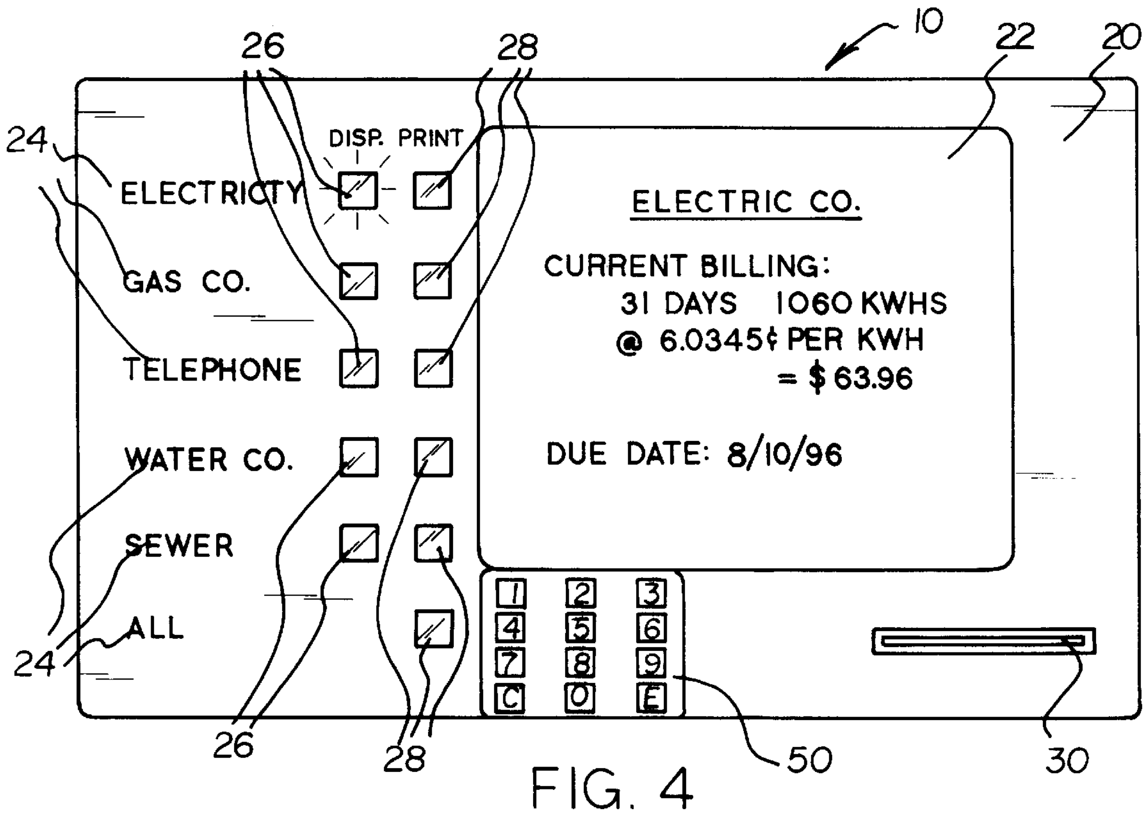
FIG. 4 is a front view of the present invention.
Figure 5:
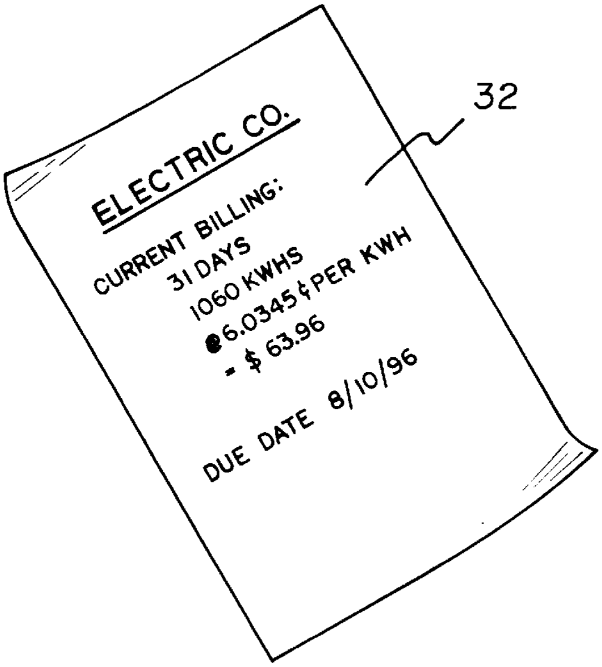
FIG. 5 is an upper perspective view of a printout from the printer.
Figure 6:
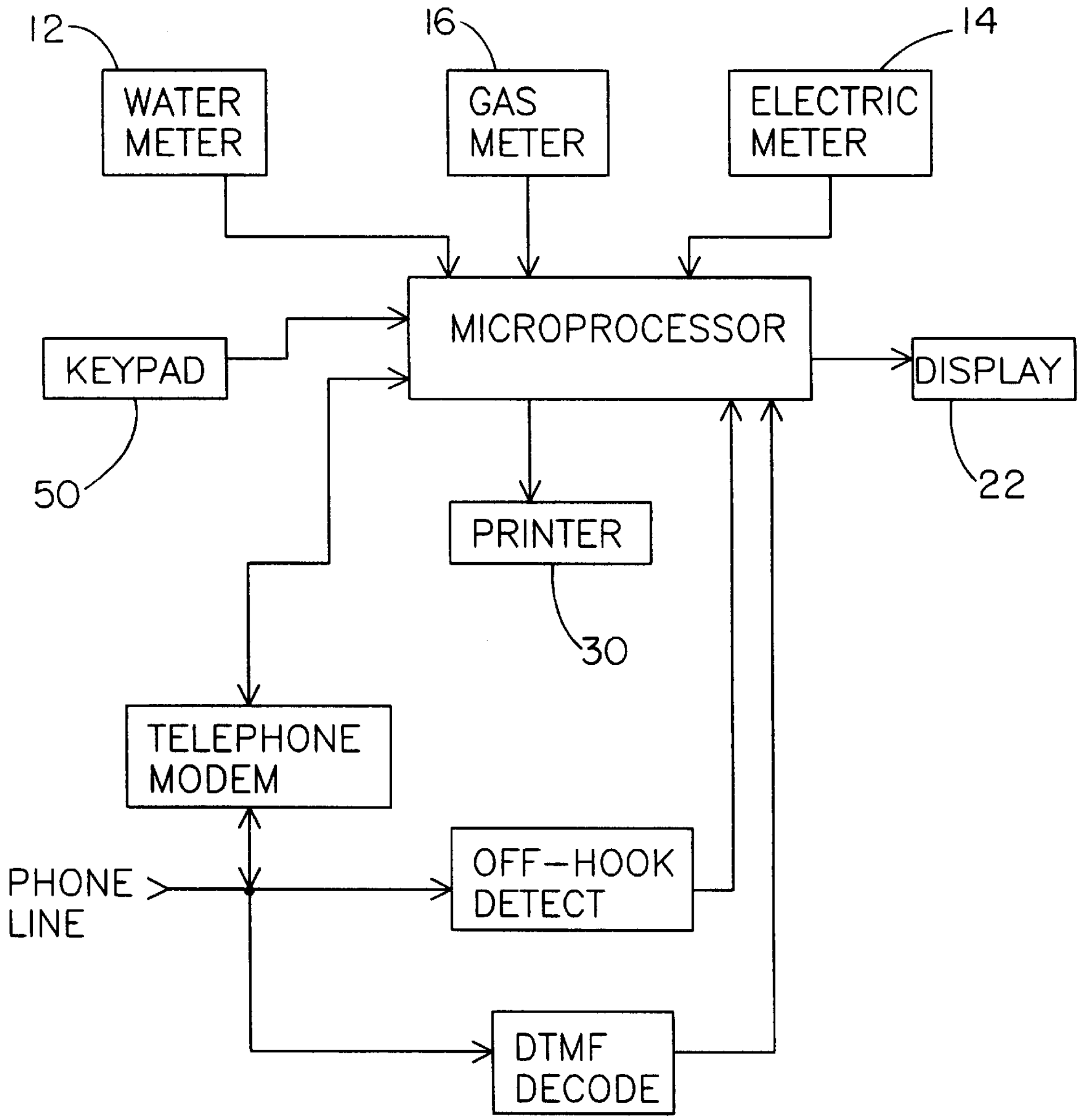
FIG. 6 is a schematic diagram of the present invention.

As shown in FIGS. 1 through 4 of the drawings, the display 22 is secured within the encasement 20 for displaying utility billing information from the unnumbered microprocessor. As shown in FIGS. 3 and 6 of the drawings, the unnumbered microprocessor is electrically connected to a water meter 12, an electric meter 14, a gas meter 16, and a telephone 18 for reading consumption data for each utility. A connecting phone cable 46 is electrically connected mesial the unnumbered microprocessor and the incoming phone cable 44 as shown in FIG. 3 of the drawings. A plurality of data cables 42 are electrically connected mesial the unnumbered microprocessor and the water meter 12, the electric meter 14 and the gas meter 16 for transferring the consumption data to the unnumbered microprocessor as shown in FIG. 3 of the drawings. As shown in FIGS. 1 and 3 of the drawings, a conduit 40 preferably surrounds the plurality of data cables 42 for protecting the data cables 42 from damage during operation of the present invention. The consumption data represents each utility's currently recorded consumption as which will be read by the utility company. The unnumbered microprocessor is also electrically connected to the display 22 for disclosing to a user a selected utility's billing information for the building structure by calculating the consumption data with a corresponding billing rate. A printer 30 is secured within the encasement 20 as best shown in FIGS. 1 and 2. The printer 30 is electrically connected to the unnumbered microprocessor for printing out the selected utility's billing information onto a printout 32 for the user, as shown in FIG. 5.

As shown in FIGS. 1 and 2, the keypad 50 is secured within the encasement 20. The keypad 50 is electrically connected to the unnumbered microprocessor for allowing the user to manually enter the billing rate of each utility. The keypad 50 is also for allowing manual control of the display 22 and the printer 30. As best shown in FIGS. 2 and 4, the encasement 20 includes a plurality of utility indicia 24 secured to a front surface of the encasement 20 adjacent to the keypad for identifying the utilities to be disclosed upon the display 22. As shown in FIGS. 1, 2, and 4, the keypad 50 includes a plurality of display switches 26 for allowing manual control of the display 22 corresponding to the plurality of utility indicia 24. The keypad 50 further includes a plurality of print switches 28 for allowing manual control of the printer 30 corresponding to the plurality of utility indicia 24.

As shown in FIG. 6 of the drawings, a modem is secured within the encasement 20. The modem is electrically connected to the unnumbered microprocessor and is electrically connected to an incoming phone cable 44. The modem receives data from a remote terminal of a utility company which sends the billing rate to the unnumbered microprocessor for calculating the bill amount. The modem is preferably capable of transferring the billing information to the user in a remote position thereby allowing the user to maintain management of the utilities.

In use, the consumption information from the water meter 12, the electric meter 14, the gas meter 16 and the telephone 18 is constantly measured by the unnumbered microprocessor. The user presses the corresponding display switch 26 of the selected utility which the user desires to determine the current billing information. The billing information is calculated by the unnumbered microprocessor according to billing rates entered manually by the user through the keypad 50 or the billing rates transferred through the unnumbered modem by the utility company. The calculated billing information is thereafter displayed upon the display 22 by the unnumbered microprocessor for the user to view. If the user desires to have a printout 32 of the current billing information for the selected utility, the user merely presses the corresponding print switch 28 which activates the unnumbered microprocessor to send printing data to the printer 30 for printing the printout 32 which contains the billing information.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A utility meter and display system comprising:

an encasement having an interior, wherein said encasement is constructed for mounting to an interior wall of a building structure;

a display on said encasement for displaying utility billing information from a microprocessor;

said microprocessor being electrically connected to various utilities such as a water meter, an electric meter, a gas meter, and a telephone for reading a consumption data for each utility;

wherein said consumption data represents each utility s currently recorded consumption;

said microprocessor being electrically connected to said display for disclosing to a user a selected utility's billing information for said building structure by calculating said consumption data with a corresponding billing rate, said billing information including a bill amount;

a printer secured in said encasement and electrically connected to said microprocessor for printing out said selected utility's billing information onto a printout for said user;

a keypad mounted on said encasement and electrically connected to said microprocessor for allowing said user to manually control said display and said printer and for allowing said user to manually enter said billing rate of each utility as a first manner for establishing a billing rate for calculating said bill amount;

a modem mounted in said encasement, said modem being electrically connected to said microprocessor and electrically connected to an incoming phone cable, wherein said modem is adapted to receive data from a remote terminal of a utility company for supplying said billing rate to said microprocessor as a second manner for establishing a billing rate for calculating said hill amount;

wherein said encasement includes a plurality of utility indicia secured to a front surface of said encasement adjacent to said keypad for identifying said utilities displayable on said display;

wherein said keypad includes a plurality of display switches for allowing manual control of said display and being associated with said plurality of utility indicia, and a plurality of print switches for allowing manual control of said printer and being associated with said plurality of utility indicia;

a connecting phone cable electrically connected between said microprocessor and said incoming phone cable;

a plurality of data cables electrically connected between said microprocessor and said water meter, said electric meter and said gas meter for transferring said consumption data to said microprocessor;

a conduit surrounding said plurality of data cables for protecting said data cables from damage; and wherein said modem is capable of transferring said billing information to said user in a remote location from said encasement to thereby allow said user to maintain management of said utilities.

* * * * *